3,472,701
BATTERY SEAL
Theodore B. Selover, Jr., Shaker Heights, and James L. Benak, Bedford Heights, Ohio, assignors to The Standard Oil Company, Cleveland, Ohio, a corporation of Ohio
Filed Feb. 24, 1967, Ser. No. 618,372
Int. Cl. H01m 1/02
U.S. Cl. 136—168          19 Claims

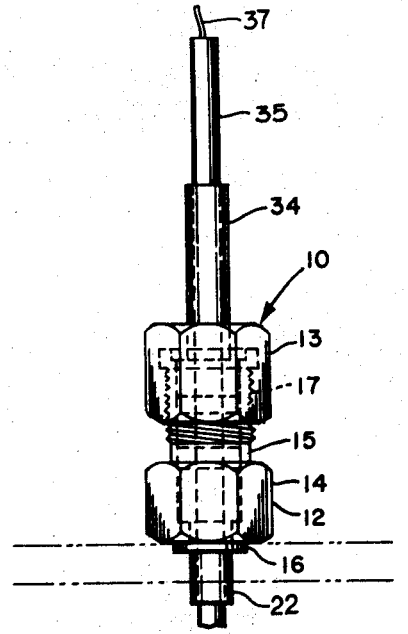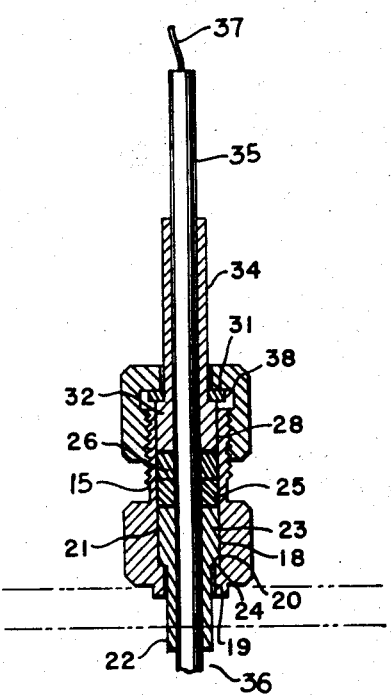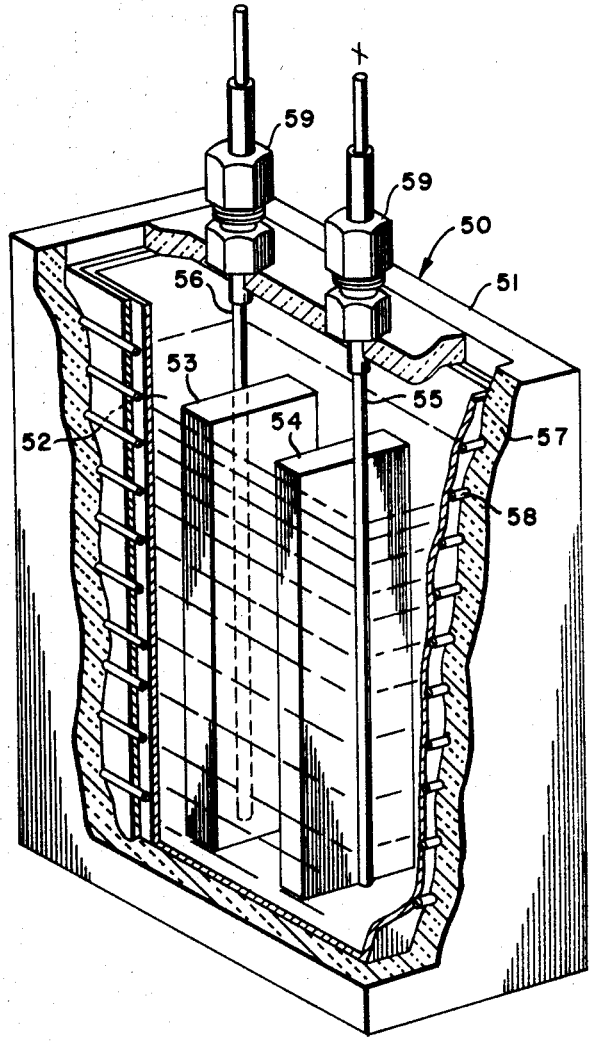
INVENTORS.
JAMES L. BENAK
THEODORE B. SELOVER, JR.
ATTORNEYS

United States Patent Office 3,472,701
Patented Oct. 14, 1969

ABSTRACT OF THE DISCLOSURE

Method and apparatus for sealing an electrochemical device such as a fuel cell or a battery against leakage, both electrical and fluid. A seal comprising a metallic coupling with inner portions of certain ceramic insulating material.

BACKGROUND OF THE INVENTION

This invention relates to a seal, and more particularly to a seal useful under the most chemically severe conditions. The general requirements of such a seal are that it be easy to fabricate, compact and inexpensive. Additionally, when the seal is used to close a high temperature molten salt battery, the seal must be a good electrical insulator, and impermeable to fluid leakage in or out of the battery. The seal must also be heat and corrosion resistant at the operating conditions of the device.

The prior art has included crude means of sealing electrochemical devices, namely conventional lead-acid storage batteries as used in an automobile. Examples of such seals are asphalt (U.S. Patent No. 1,032,529), $C_1$–$C_{20}$ halogenated hydrocarbons (U.S. Patent No. 1,729,242) or an inorganic matrix (U.S. Patent No. 2,739,114). Also, there is commercially available a mechanical gland similar in outward appearance to the seal described herein, however, lacking the ability to withstand the corrosive nature of the internal fluid.

Of course, the prior art has also included means for sealing equipment used in a highly corrosive atmosphere, such as an atomic reactor. This sealing means has primarily been in the nature of providing conventional battery seals in combination with means to cool the sealed portion, i.e., coolant passageways (U.S. Patent No. 3,085,053), so that the corrosive nature of the material contacting the sealed portion is lessened. Another suggested means for sealing an atomic reactor is use of glass (U.S. Patent No. 3,002,905). None of these materials or methods, however, have met the requirements as set forth above.

According to the present invent, it has now been discovered that sealing means, resistant to the most corrosive conditions presently known, is achieved, by use of a seal comprising a mechanical coupling with certain chemically inert insulating materials inside the coupling. Use of the seal is not restricted to charged electrochemical devices. When the seal of the present invention is used in a fused salt, such as for example lithium chloride or mixtures containing lithium chloride, in an electrochemical device requiring current carriers, the seal is used in combination with a tungsten current carrier. Current carriers made of materials such as for example molybdenum, zirconium, zirconium diboride, and tantalum, can also be used depending on the application.

The mechanical coupling forming a part of the present invention is a metal body, generally cylindrical in shape, and connecting the internal portions of the electrochemical device with its external portions. In one embodiment of the present invention, the coupling comprises an externally threaded male coupling member. This externally threaded member is joined to an internally threaded female coupling member. The coupling portion of the seal may be constructed of any non-corrosive material, preferably metal, e.g. stainless steel, nickel, or tungsten. Tungsten can but should not be used primarily for two reasons: (1) tungsten is more dense and thereby heavier, and (2) serious corrosion occurs on the positive electrode while the coupling is connected to the negative electrode. The seal of the present invention is operable to a temperature above operating temperature of the cell. The coupling portion of the seal is described in more detail below.

The internal or insulating portions of the seal comprise four principal sections: (1) a lower follower or sleeve, (2) a powdery sealant, (3) a lava sealant and (4) an upper follower or sleeve. The lower follower and powdery sealant desirably are selected from the group consisting of beryllium oxide (BeO), thorium oxide (ThO$_2$), magnesium oxide (MgO), lithium aluminate (LiAlO$_2$), boron nitride (BN), silicon nitride (Si$_3$N$_4$), aluminum nitride (AlN), and mixtures thereof.

The lower follower contacts the corrosive liquid fused salt. Therefore, the selection of this material is a critical step of the present invention. Because the lower follower does contact the fused salt and is subjected to highly corrosive conditions, it is of paramount importance that it be insoluble in fused salt.

Another requirement of the material used as the lower follower is that it be a non-conductor. This is necessitated by the fact that the lower follower as well as the other insulating components of the seal, which form a sleeve around the charged current carrier, must be separated from the oppositely charged mechanical coupling and housing, thus preventing a short circuit. In addition, the lower follower must also be of a high melting point, high enough to withstand the temperatures generally associated with high temperature fused salt batteries, that is a melting point of at least above operating temperature of the cell. Also, the lower follower, in a fabricated form, should have the mechanical strength, both compression and tensile, capable of withstanding the pressures involved with tightening the coupling. For instance, one material, found useful for the lower follower, has been pressed boron nitride with a room temperature compression strength of about 45,000 p.s.i. axially of the applied force and about 34,000 p.s.i. perpendicular to the axis of applied force.

An important property of the follower is high purity. Contaminants are attacked by the corrosive nature of the fused salt. Lastly, the follower must be completely stable in the environment of the fused salt at operating potentials. It is only by actual practice that the stability of the lower follower can be ascertained. In theory, by examining only the equilibrium constants of the materials selected for use, none should be operable in our system. However, in spite of this, the named materials have been found to be operable in practice. The material most nearly fitting all of these requirements is boron nitride (BN).

The powdery sealant forming a part of the present invention is desirably boron nitride (BN) also. The chemical requirements of this material are much the same as for the lower follower. It is this component that actually forms the liquid tight seal. The powdery sealant is desirably of high purity and the particles of such will pass a 40 mesh screen or finer. In practice, the powdery sealant material is placed into the male member adjacent the lower follower and tamped into place to insure as compact a fit as possible. On the battery side of the powdery sealant is the lower follower and on the side of the powdery sealant away from the battery is the lava sealant.

Lava herein is defined as a naturally fired MgSiO$_3$. The lava, or a substitute therefor, is necessary to retain the powdery sealant and to stop gas flow. Once the battery is sealed it has an inert atmosphere and during operation of the battery, gas can be evolved. Gaseous substances attempt to find their way out of the cell. Therefore, the seal must be sealed against such leakage. It is, therefore, recognized that the lava sealant must be inert to degradation by gases evolved during operation.

Also, it is desirable that the lava sealant be heat stable and have a compression strength such that upon compression caused by tightening the coupling, the edges of the sealant are crushed but the main body of the sealant withstands the pressures and remains in one piece.

Another important property of this section is that the material used be not only a non-conductor as are the other internal components, but also characterized by cold flow properties; that is, under extreme pressures, the material flows as a liquid. For this reason, lava has been found desirable for use in a high temperature fused salt electrochemical device, but Teflon and certain rubbers as Neoprene could work equally well at lower temperatures and under certain conditions.

On the side of the lava sealant away from the crushed powdery sealant and the battery is an upper follower or sleeve. The upper follower, again, must be a ceramic insulator thermally stable, inexpensive, and maintain its shape under high compression. The upper follower is selected from the group consisting of beryllium oxide (BeO), thorium oxide (ThO$_2$), magnesium oxide (MgO), aluminum oxide (Al$_2$O$_3$), lithium aluminate (LiAlO$_2$), boron nitride (BN), silicon nitride (Si$_3$N$_4$), aluminum nitride (AlN), and mixtures thereof. In fact, any fired ceramic body with high compressive and tensile strength which is an electrical insulator and is thermally stable at cell operating temperature can be used since the upper sleeve is not exposed to corrosive conditions inside the electrochemical device.

This follower is designed to retain the lava in place and to permit the application of pressure to the entire assembly. This follower is designed with a shoulder mating with the inside of the female coupling member so that when the male and female members of the coupling are joined and tightened, pressure is applied to the shoulder and transmitted to each of the other components. Thus, this follower and particularly the pressure-bearing shoulder must have the mechanical strength to withstand high pressures. A material which can be used, aluminum oxide (Al$_2$O$_3$), has a room temperature compressive strength of about 375,000 p.s.i. However, other materials from the above group with lower compressive strength can be used. The male and female members of the coupling are tightened enough to prevent leakage. A torque of 40 to 90 foot-pounds is usually applied to a seal gland incorporating boron nitride wherein diameter of the current collector is $\frac{3}{16}$ of an inch, annular area 0.123 in.$^2$, and the outside diameter of threads is $\frac{9}{16}$ of an inch. Desirably implaced between the shoulder of the upper follower and the coupling member is a compression ring which helps protect the upper follower from chewing action when tightening the members of the coupling.

From a materials standpoint, it has been found desirable to construct the lower follower and crushed powdery sealant from boron nitride (BN), to construct the lava sealant from naturally fired magnesium silicate (MgSiO$_3$), and to construct the upper follower from aluminum oxide (Al$_2$O$_3$).

When the seal is used to seal an electrochemical device involving electrodes and current carriers, the device is desirably used, in combination with a current carrier which traverses the seal having the following properties: a desirable current carrier would have the properties of low specific electrical resistivity, impermeable to fluid penetration, resistant to gases at the positive electrode and stable to the liquid ion-containing and conducting medium. Tungsten answers all of these requirements. Therefore, salt leakage up through the current carrier, as might be found in a similar material of the prior art such as graphite, is prohibited. In addition, the electrical resistivity of graphite is prohibitively high compared to tungsten.

Referring more particularly to the drawings,
FIG. 1 illustrates the seal of the present invention;
FIG. 2 is a cross-sectioned view of the seal;
FIG. 3 is an alternative view of the lower follower; and
FIG. 4 is an isometric view partially broken away, of the seal used in a battery.

Referring more particularly to FIG. 1 there is shown generally at reference numeral 10 a seal of the present invention. However, the seal is not to be limited to an elongated body but may have other configurations. The seal is a coupling of two members, a male member 12 and a female member 13. The male member 12 comprises a central polygonal cross-section portion 14, an upper reduced extension member 15 and a lower extension member 16. The member 15 extends upward from the central portion and is provided with exterior screw threads 17 by which female member 13 is attached.

The interior of the male member is provided with a longitudinal cylindrical bore 18 which at its lower end is reduced in diameter as shown at 19. Thus, an inwardly extending shoulder 20 is created between the upper end and the lower end of the male member. The lower end of the male member contains lower follower 21 which is slidably received. The lower follower 21 comprises a cylindrical stem 22, and an upper cylindrical head 23 of larger diameter than the stem 22. Joining the stem 22 and the upper cylindrical head 23 is an inwardly directed shoulder 24 mating with the shoulder 20 when the lower follower is in place within the male member 12. The lower follower is retained in place, by the shoulder 20. The lower follower is axially aligned within the bore 18. The follower when in place, snugly fits the bore of the mlae member and extends below the lower extension member 16.

An alternative design for the lower follower involves a ridge design as depicted in FIG. 3. This design is desirable when utilizing powdery sealants which do not have the necessary lubricity or cold flow properties. It has been found that when assemblying the devices it is necessary to tighten the coupling a required amount. When the top of the lower follower is flat and the powdery sealant has the necessary lubricity, a force perpendicular to the axis of the coupling is exerted on the sidewalls to cause them to bulge and the necessary liquid tight seal results. However, when a flat lower follower is used with a sealant material otherwise useable, except lacking the required lubricity, insufficient force is applied to the sidewalls to cause the bulging and therefore, there is no liquid tight seal. Therefore, when using such powdery sealants lacking lubricity, it is necessary to modify the design of the follower to achieve the side thrust. This is achieved by creating a circular ridge around the top of the follower. By this design the necessary force is applied to the sidewalls to gain a compactness of fit.

Within the upper end of the male member and in contact with the uppermost portion of the head 23 on the side away from the battery is a mass of powdery sealant 25 which as aforementioned is tamped into place initially before adding lava sealant 26. The upper level of powdery sealant extends into the upper portion of member 15.

The female member 13, as the lower portion of the male member 12, is a polygonal cross-section for ease of applying a wrench. The female member is provided with a cylindrical bore 28 of reduced diameter at its upper end and of enlarged diameter at its central potrion forming a retaining shoulder 31. The enlarged diameter portion forms a recess or well which is screw threaded to receive the extension member 15. The recess is also adapted to receive the lava sealant 26 and upper follower 32.

The bore above the lava sealant is adapted to receive the elongated cylindrical head and a stem 34 of the upper follower 32. The lava sealant 26 and upper follower 32 are axially aligned within the bore 28 and are slidably received within the bore 28. The lava sealant 26 contacts the powdery sealant on the side opposite the battery. The upper follower, likewise, contacts the lava sealant on its side away from the battery. The upper follower is held in place by the shoulder 31 and extends upward beyond the female member 13.

The bore of the male member 12 and the bore of the female member 13 as well as the insulators are intended to allow passage of a current carrier 35 which extends from the internal portion of the battery 36 to a lead wire 37 connected to an external load (not shown).

When the male and female members are joined and screwed together, they are tightened to about 40 to 90 foot-pounds of torque as aforementioned. Such a torque crushes the lava sealant around its periphery and also crushes the powdery sealant to complete the seal.

The powdery sealant is put under compression and crushed which, it is believed, causes a portion of the sidewalls of the male member to bulge outwardly to their elastic limit. During operation, when the battery is at operating temperatures, such as for example 250–600° C. for alkali halides, and the seal is likewise approaching these temperatures, the expansion of the sidewalls and the powdery sealant which has a much lower expansion coefficient than the steel sidewalls, expands the portion of the sidewalls not expanded by the compressive force to its elastic limit. The portion previously expanded by the compressive force remains unaffected. Therefore, in spite of the thermal expansion, this section of the seal remains liquid tight. It follows that the sidewalls of the coupling must have a high yield strength and low elastic modulus.

The seal is intended to be mounted within the wall of a vessel, preferably an electrochemical device such as a battery.

The construction of the seal of the present invention makes it possible to prevent leakage from a vessel under the most adverse conditions. This is because the lower follower 21, pressing against the shoulder 20 is retained in place by the powdery sealant 25 which in turn is compressed and held in place by the lava sealant 26 which in turn is held in place by the upper follower 32 and a compression ring 38. The compression ring 38 rests on the shoulder 31. The compression ring besides holding the upper follower in place also prevents the upper follower from being chewed and partially disintegrated by the rotary movement when tightening the male and female members of the coupling.

When the members are tightened and the internal members compressed, the internal members are prevented from moving. Each of the internal members is in firm contact with the adjacent member.

One illustration of use of the present invention is in a battery shown generally at 50. A casing or housing 51 serves as a storage reservoir for the ion-containing and conducting medium 52. Contained in the housing and immersed in the ion-containing and conducting medium are oppositely charged electrodes 53 and 54, oppositely placed from one another with the ion-containing and conducting medium intermediate thereof. Securely attached to the electrode are tungsten electrical current carriers 55 and 56. The housing is fabricated of heat resistant, non-corrosive material. The material must be a corrosion resistant material such as for example steel, stainless steel or nickel. Within the walls of the housing, the battery is surrounded by insulation 57 which may be any known insulator such as asbestos or fiber glass. Throughout the walls of the housing are, optionally, heating elements 58 to supply heat to the battery until operating temperatures are reached. Once operating temperatures are attained and the battery is producing electricity, the battery temperature can be independently maintained.

The negative electrode of the battery contains as one chemical element a cation common to the component of the ion-containing and conducting medium with the lowest decomposition potential, such as for example lithium, potassium, sodium and magnesium. The positive electrode is formed from a material, such as for example carbon and nickel, which is capable of storing the anion from the ion-containing and conducting component with lowest decomposition potential. In the embodiment shown, each electrode is insulated from the casing or housing, but it is recognized that in another embodiment one of the electrodes may be directly attached to the housing and the opposed electrode attached to a header or plate insulated from the housing. Thus, for the one electrode, the housing serves as a current collector while for the other the header serves as a current collector.

The ion-containing and conducting medium is a medium comprising a source of ions and preferably alkali metal and halide ions free to move in the medium. Typical examples of materials which can be used as ion-containing and conducting media include binary and ternary salt mixtures such as lithium chloride-potassium chloride, potassium chloride-magnesium chloride, magnesium chloride-sodium chloride, lithium bromide-potassium bromide, calcium chloride-lithium chloride, lithium fluoride-rubidium fluoride, magnesium, chloride-rubidium chloride, lithium iodide-potassium iodide, and mixtures thereof. Examples of ternary mixtures are lithium chloride-potassium chloride-sodium chloride and lithium bromide-sodium bromide-lithium chloride. A preferred ion-containing and conducting medium is a eutectic of potassium chloride and lithium chloride which operates at about 350–550° C.

The battery is sealed by the seal 59 while using the tungsten current carrier. The tungsten carrier was found to be unique in the Li-Cl system. It is the only metal which performs well in the Li-Cl system, at the particular voltage and temperature. Other metals react. Air is prevented from entering the battery and thereby contaminating the ion-containing and conducting medium. Also, the ion-containing and conducting medium and any gases evolved are prevented from escaping from the battery.

The device as described, utilizing a carbon positive electrode, aluminum-lithium negative electrode and a potassium chloride-lithium chloride eutectic was operated inverted and uncharged for three months. The same cell was also operated in an upright position for three months between 3.34 and 0.75 volts on a continual cycling basis. In both tests the entire cells were isothermal to embody the most severe operating conditions. There was no salt leakage during either test. The cell has also been operated at pressures ranging from 29″ vacuum to 400 p.s.i.g. with similar results.

What is claimed is:
1. A seal comprising
 a body having a bore therethorugh,
 a first ceramic insulator slidably fitted in the bore at one end, and having a passage therethrough,
 a second ceramic insulator slidably fitted in the bore at the opposite end and having a passage therethrough,
 a mass of powdery sealant within the bore and intermediate said first and second ceramic insulators, and
 a second sealant, comprising lava, in contact with and intermediate the powdery sealant and the second ceramic insulator.

2. A seal as in claim 1 wherein the powdery sealant contacts both the first ceramic insulator and the lava.

3. A seal as in claim 1 wherein means is provided to apply pressure to each of the components to insure a tight fit.

4. A seal as in claim 1 wherein the first ceramic insulator and powdery sealant are composed of material selected from the group consisting of beryllium oxide, thorium oxide, magnesium oxide, lithium aluminate, boron nitride, silicon nitride, aluminum nitride, and mixtures thereof.

5. A seal as in claim 1 wherein the first ceramic insulator is composed of boron nitride.

6. A seal as in claim 1 wherein each of the first ceramic insulator and the powdery sealant is boron nitride.

7. A seal as in claim 1 wherein the second ceramic insulator is composed of material selected from the group consisting of beryllium oxide, thorium oxide, magnesium oxide, aluminum oxide, lithium aluminate, boron nitride, silicon nitride, aluminum nitride and mixtures thereof.

8. A seal as in claim 1 wherein the second ceramic insulator is composed of aluminum oxide.

9. A seal as in claim 1 wherein the bore and the passages of the insulators and the sealants are axially aligned and extending therethrough is a current carrier.

10. A seal as in claim 9 wherein the current carrier is composed of tungsten.

11. A seal comprising
a body having a bore therethrough,
an insulator composed of boron nitride slidably fitted in the bore at one end, and having a passage therethrough,
an insulator composed of aluminum oxide slidably fitted in the bore at the opposite end and having a passage therethrough,
a mass of powdery sealant within the bore and intermediate the boron nitride insulator and the aluminum oxide insulator,
a second sealant, comprising lava, in contact with and intermediate the powdery sealant and the aluminum oxide insulator, and
the bore and the passages of the insulators and the sealants being axially aligned and a current carrier extending therethrough.

12. A seal as in claim 11 wherein the current carrier is composed of tungsten.

13. In an electrochemical device comprising the combination of
an ion-containing and conducting medium,
a pair of oppositely charged electrodes immersed in the ion-containing and conducting medium, the electrodes being spaced apart from one another in the medium,
a housing containing the ion-containing and conducting medium and the electrodes, and means to join electrodes with the external atmosphere, the improvement comprising;
a seal comprising
a coupling,
a first follower within the coupling and in contact with the ion-containing and conducting medium and in contact with,
a powdery sealant impervious to the liquid medium,
a lava sealant contacting the powdery sealant opposite the first follower and impervious to gas,
a second follower in contact with the lava sealant opposite the powdery sealant and in contact with the external atmosphere, the second follower providing means whereby pressure can be applied to each of the components to insure a tight fit.

14. The device of claim 13 wherein the first follower and the powdery sealant are composed of material selected from the group consisting of beryllium oxide, thorium oxide, magnesium oxide, lithium alumiante, boron nitride, silicon nitride, aluminum nitride and mixtures thereof.

15. The device of cliam 13 wherein the means to join electrodes with the external atmosphere is a tungsten current carrier.

16. The device of claim 13 wherein the second follower is composed of material selected from the group consisting of beryllium oxide, thorium oxide, magnesium oxide, aluminum oxide, lithium aluminate, boron nitride, silicon nitride, aluminum nitrides, and mixtures thereof.

17. The device of claim 13 wherein the first follower is composed of boron nitride.

18. The device of claim 13 wherein the powdery sealant is composed of boron nitride.

19. The device of claim 13 wherein the second follower is composed of aluminum oxide.

References Cited

UNITED STATES PATENTS

| | | | |
|---|---|---|---|
| 2,301,022 | 11/1942 | Dalpayrat | 136—83.1 |
| 2,799,522 | 7/1957 | King et al. | 277—110 XR |
| 2,996,568 | 8/1961 | Hany | 174—77 XR |
| 3,281,348 | 10/1966 | Schumacher et al. | |

WINSTON A. DOUGLAS, Primary Examiner

D. L. WALTON, Assistant Examiner

U.S. Cl. X.R.

136—135; 174—77, 152; 204—279; 277—110